United States Patent
Hashimoto et al.

(10) Patent No.: US 11,472,906 B2
(45) Date of Patent: Oct. 18, 2022

(54) ACTINIC-RAY-CURABLE RESIN COMPOSITION, GAS-BARRIER FILM, AND MULTILAYER STRUCTURE

(71) Applicant: MITSUBISHI GAS CHEMICAL COMPANY, INC., Tokyo (JP)

(72) Inventors: Ryoma Hashimoto, Kanagawa (JP); Kazuki Kouno, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/733,996

(22) PCT Filed: May 31, 2019

(86) PCT No.: PCT/JP2019/021769
§ 371 (c)(1),
(2) Date: Dec. 1, 2020

(87) PCT Pub. No.: WO2019/235384
PCT Pub. Date: Dec. 12, 2019

(65) Prior Publication Data
US 2021/0214479 A1  Jul. 15, 2021

(30) Foreign Application Priority Data
Jun. 6, 2018  (JP) .............................. JP2018-108524

(51) Int. Cl.
C08F 222/38   (2006.01)
B32B 27/08    (2006.01)
(Continued)

(52) U.S. Cl.
CPC ............ C08F 222/385 (2013.01); B32B 7/12 (2013.01); B32B 27/08 (2013.01); B32B 27/32 (2013.01);
(Continued)

(58) Field of Classification Search
CPC .................. C08F 222/385; C08F 220/14; C08F 220/325; C08F 220/36; C08F 220/56; C08F 2/44; C08F 2/50; C08F 220/26; C08F 230/02; B32B 7/12; B32B 27/08; B32B 27/32; B32B 27/36; B32B 2255/10; B32B 2255/20; B32B 2255/26; B32B 2307/7244; B32B 2250/24; B32B 2307/306; B32B 2307/4026; B32B 27/281; B32B 27/302; B32B 27/365; B32B 2250/02; B32B 2255/205; B32B 2255/28; B32B 2307/412; B32B 2307/516; B32B 2307/518; B32B 2307/7163; B32B 2307/732; B32B 2307/748; B32B 2439/70; B32B 2439/80; B32B 2553/00; B32B 27/16; B32B 27/306; B32B 27/308; B32B 27/34; B32B 2307/7242; C09D 4/00; C09J 175/04; C08J 5/18; C08J 7/0423; C08J 7/048

See application file for complete search history.

(56) References Cited

U.S. PATENT DOCUMENTS

2003/0190480 A1   10/2003  Kutsuna et al.
2011/0236674 A1*  9/2011   Aiba .................. C08J 7/046
                                                  428/335

(Continued)

FOREIGN PATENT DOCUMENTS

JP   57-129442 A   8/1982
JP   11-160883 A   6/1999
(Continued)

OTHER PUBLICATIONS

International Search Report issued in International Patent Application No. PCT/JP2019/021769, dated Jul. 16, 2019 and English Translation thereof.

(Continued)

Primary Examiner — John D Freeman
(74) Attorney, Agent, or Firm — Greenblum & Bernstein, P.L.C.

(57) ABSTRACT

An active energy ray-curable resin composition containing:
a reaction product (X) of a component (A) and a component (B) below:
(A) at least one selected from the group consisting of meta-xylylenediamine and para-xylylenediamine;
(B) at least one selected from the group consisting of unsaturated carboxylic acids represented by the following general formula (1) and derivatives of the unsaturated carboxylic acids:

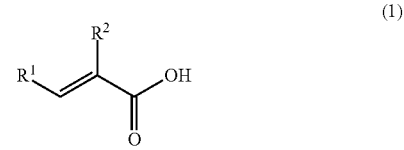

(1)

wherein, in the formula (1), $R^1$ and $R^2$ each independently represent a hydrogen atom, an alkyl group having from 1 to 8 carbon atoms, an aryl group having from 6 to 12 carbon atoms, or an aralkyl group having from 7 to 13 carbon atoms;
(C) a compound having at least one group selected from the group consisting of a glycidyl group and an isocyanate group, and an ethylenically unsaturated bond-containing group; and
(D) a phosphoric acid derivative having an ethylenically unsaturated bond-containing group.

12 Claims, 2 Drawing Sheets

(51) Int. Cl.
  *B32B 27/32* (2006.01)
  *B32B 7/12* (2006.01)
  *B32B 27/36* (2006.01)
  *C08F 220/14* (2006.01)
  *C08F 220/56* (2006.01)
  *C08F 220/32* (2006.01)
  *C08F 220/36* (2006.01)

(52) U.S. Cl.
  CPC ............ *B32B 27/36* (2013.01); *C08F 220/14* (2013.01); *C08F 220/325* (2020.02); *C08F 220/36* (2013.01); *C08F 220/56* (2013.01); *B32B 2255/10* (2013.01); *B32B 2255/20* (2013.01); *B32B 2255/26* (2013.01); *B32B 2307/7244* (2013.01)

(56) References Cited

U.S. PATENT DOCUMENTS

| | | | |
|---|---|---|---|
| 2013/0136936 A1* | 5/2013 | Morozumi | ............ B32B 27/06 428/500 |
| 2016/0017095 A1 | 1/2016 | Honda et al. | |

FOREIGN PATENT DOCUMENTS

| | | |
|---|---|---|
| JP | 11-291653 A | 10/1999 |
| JP | 2000-43437 A | 2/2000 |
| JP | 2003-300271 A | 10/2003 |
| JP | 2004-17521 A | 1/2004 |
| JP | 2005-28835 A | 2/2005 |
| JP | 2012-184294 A | 9/2012 |
| JP | 6241476 | 12/2017 |
| KR | 20170096883 | 8/2017 |
| WO | 2014/157151 A1 | 10/2014 |

OTHER PUBLICATIONS

Written Opinion of the International Searching Authority issued in International Patent Application No. PCT/JP2019/021769, dated Jul. 16, 2019 and English Translation thereof.

* cited by examiner

ACTINIC-RAY-CURABLE RESIN COMPOSITION, GAS-BARRIER FILM, AND MULTILAYER STRUCTURE

TECHNICAL FIELD

The present invention relates to an active energy ray-curable resin composition, and a gas barrier film and laminate in which the active energy ray-curable resin composition is used.

BACKGROUND ART

Packaging materials used for food products, pharmaceuticals, cosmetics, precision electronic components, and the like require high oxygen barrier properties and water vapor barrier properties to prevent deterioration of the contents.

Oxygen barrier properties of thermoplastic plastic films are typically not so high, and thus means for imparting gas barrier properties to the films have been studied, including a method for forming a gas barrier layer of various types, such as a polyvinylidene chloride (PVDC) layer or a polyvinyl alcohol (PVA) layer, and a method for vapor-depositing an inorganic substance, such as alumina ($Al_2O_3$) or silica ($SiO_2$).

Films having a PVDC layer formed as a gas barrier layer are transparent and exhibit good barrier properties. However, films having a PVDC layer, when incinerated as general wastes, may generate hazardous gases, such as acid gases, and thus a transition to other materials have been desired in terms of environmental consideration. Films in which a PVA layer is formed exhibit excellent gas barrier properties under low humidity but are highly hygroscopic, causing a problem in that the gas barrier properties rapidly decreases at a relative humidity of approximately 70% or higher.

Inorganic substance-vapor-deposited films in which an inorganic substance, such as alumina or silica, is vapor-deposited on a thermoplastic plastic film are transparent and have good gas barrier properties, and do not cause the problems described above. However, inorganic substance-vapor-deposited films, when bent, generate a crack in a vapor-deposited inorganic layer, causing a problem in that the gas barrier properties are significantly reduced.

As methods for improving the bending resistance of a gas barrier film or gas barrier laminate including a layer on which an inorganic substance is vapor-deposited, methods for forming a layer formed of a cured product of an epoxy resin composition containing a given epoxy resin and a given epoxy resin curing agent as main components have been proposed. For example, epoxy resin compositions having high gas barrier properties and adhesion have been proposed, the epoxy resin compositions containing an epoxy curing agent that is a reaction product of meta-xylylenediamine or para-xylylenediamine and an unsaturated carboxylic acid with a given structure and/or and a derivative of the unsaturated carboxylic acid (Patent Documents 1 and 2).

On the other hand, as a method for obtaining an excellent gas barrier resin layer in a short time without performing heat treatment at high temperatures, a method using an active energy ray-curable resin has been proposed. For example, Patent Document 3 discloses an active energy ray-curable resin that has excellent transparency and workability and can provide a cured product having excellent gas barrier properties without performing heat treatment at high temperatures, and a gas barrier laminate including a cured product of the resin.

CITATION LIST

Patent Documents

Patent Document 1: JP 2003-300271 A
Patent Document 2: JP 2005-028835 A
Patent Document 3: JP 6241476 B

SUMMARY OF INVENTION

Technical Problem

The active energy ray-curable resin described in Patent Document 3 is obtained by further reacting a (meth)acrylic acid-based compound having at least one glycidyl group or isocyanate group with a reaction product of a given diamine and a given unsaturated carboxylic acid and/or a derivative of the unsaturated carboxylic acid. However, in terms of ease of production, the present inventors have studied omitting a part of the production process of the active energy ray-curable resin (the reaction of the reaction product and the (meth)acrylic acid-based compound); forming an active energy ray-curable resin composition containing a reaction product of a given diamine and a given unsaturated carboxylic acid and/or a derivative of the unsaturated carboxylic acid, and a (meth)acrylic acid-based compound having at least one glycidyl group or isocyanate group; and applying this resin composition to a gas barrier film and laminate.

However, the present inventors have found a problem in that when the resin composition is used after a lapse of time from the preparation, adhesion of the resulting cured product to a vapor-deposited surface of an inorganic substance-vapor-deposited film tends to decrease. In the active energy ray-curable resin described in Patent Document 3, such a problem has not been found.

An object of the present invention is to provide an active energy ray-curable resin composition that is easy to produce and can form a cured product with excellent gas barrier properties and good adhesion to an inorganic thin film layer. Another object of the present invention is to provide an active energy ray-curable resin composition that has excellent stability over time and thus achieves a small reduction in adhesion of the resulting cured product to an inorganic thin film layer even when the active energy ray-curable resin composition is used after a lapse of time from the preparation. Still another object of the present invention is to provide a gas barrier film and laminate in which the active energy ray-curable resin composition is used.

Solution to Problem

The inventors of the present invention have found that formation of an active energy ray-curable resin composition can solve the above problems, the active energy ray-curable resin composition containing: a reaction product of a given diamine and at least one selected from the group consisting of unsaturated carboxylic acids and derivatives of the unsaturated carboxylic acids; a compound having at least one group selected from the group consisting of a glycidyl group and an isocyanate group, and an ethylenically unsaturated bond-containing group; and a phosphoric acid derivative having an ethylenically unsaturated bond-containing group.

The present invention relates to the following (1) to (12).

(1) An active energy ray-curable resin composition containing:
a reaction product (X) of a component (A) and a component (B) below:
(A) at least one selected from the group consisting of meta-xylylenediamine and para-xylylenediamine;
(B) at least one selected from the group consisting of unsaturated carboxylic acids represented by the following general formula (1) and derivatives of the unsaturated carboxylic acids:

[Chem. 1]

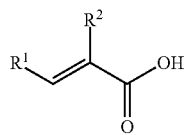

(1)

wherein, in the formula (1), $R^1$ and $R^2$ each independently represent a hydrogen atom, an alkyl group having from 1 to 8 carbon atoms, an aryl group having from 6 to 12 carbon atoms, or an aralkyl group having from 7 to 13 carbon atoms;
(C) a compound having at least one group selected from the group consisting of a glycidyl group and an isocyanate group, and an ethylenically unsaturated bond-containing group; and
(D) a phosphoric acid derivative having an ethylenically unsaturated bond-containing group.

(2) The active energy ray-curable resin composition according to (1) above, wherein the component (B) is at least one selected from the group consisting of acrylic acid, methacrylic acid, crotonic acid, and derivatives of these acids.

(3) The active energy ray-curable resin composition according (1) or (2) above, wherein the component (C) is at least one selected from the group consisting of glycidyl (meth)acrylate and 2-isocyanatoethyl (meth)acrylate.

(4) The active energy ray-curable resin composition according to any one of (1) to (3) above, wherein the component (D) is a compound represented by the following general formula (2):

[Chem. 2]

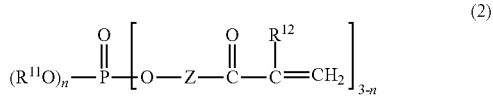

(2)

wherein, in the formula (2), $R^{11}$ is a hydrogen atom, an alkyl group having from 1 to 12 carbon atoms, or a monovalent group represented by —$(C_mH_{2m})_p$—OH, where m is a number from 1 to 6 and p is a number from 1 to 10; $R^{12}$ is a hydrogen atom or a methyl group; Z is a divalent group represented by —$(C_rH_{2r}O)_q$—, where r is a number from 1 to 6 and q is a number from 1 to 20, or —$R^{13}$—COO—$(C_rH_{2r}O)_q$—, where $R^{13}$ is an alkylene group having from 1 to 12 carbon atoms and r and q are the same as described above; and n is a number of 0, 1, or 2.

(5) The active energy ray-curable resin composition according to any one of (1) to (4) above, wherein a content of the component (D) is from 0.1 to 10 parts by mass relative to 100 parts by mass of the reaction product (X).

(6) The active energy ray-curable resin composition according to any one of (1) to (5) above, further containing a photopolymerization initiator.

(7) The active energy ray-curable resin composition according to any one of (1) to (6) above, further containing a non-spherical inorganic particle.

(8) A method for producing the active energy ray-curable resin composition described in any one of (1) to (6) above, the method including: preparing a solution (a) containing the reaction product (X); mixing the component (C) and the component (D) or a solution containing the component (D) to prepare a solution (b); and mixing the solution (a) and the solution (b).

(9) A method for producing the active energy ray-curable resin composition described in (7) above, the method including: preparing a solution (a) containing the reaction product (X); mixing the component (C) and the non-spherical inorganic particle or a dispersion liquid of the non-spherical inorganic particle, then adding the component (D) or a solution containing the component (D) to prepare a solution (b'); and mixing the solution (a) and the solution (b').

(10) A cured product of the active energy ray-curable resin composition described in any one of (1) to (7) above.

(11) A gas barrier film having: a substrate film having an inorganic thin film layer; and a cured resin layer formed of the cured product described in (10) above.

(12) A laminate having the gas barrier film described in (11) above and a thermoplastic resin layer.

Advantageous Effects of Invention

The active energy ray-curable resin composition of the present invention has good gas barrier properties and good adhesion to an inorganic thin film layer, and can form a gas barrier cured product having excellent performance in a short time. Thus, the active energy ray-curable resin composition of the present invention can further improve gas barrier properties of gas barrier films known in the art having an inorganic thin film layer. In addition, the active energy ray-curable resin composition is easy to produce and has excellent stability over time and thus achieves a small reduction in adhesion of the resulting cured product to an inorganic thin film layer even when the resin composition is used after a lapse of time from the preparation. Thus, the active energy ray-curable resin composition of the present invention is also industrially useful.

The gas barrier film and laminate having a layer formed of a cured product of the active energy ray-curable resin composition of the present invention are suitable, for example, for packaging material applications.

DESCRIPTION OF EMBODIMENTS

Active Energy Ray-Curable Resin Composition

Figure 1:
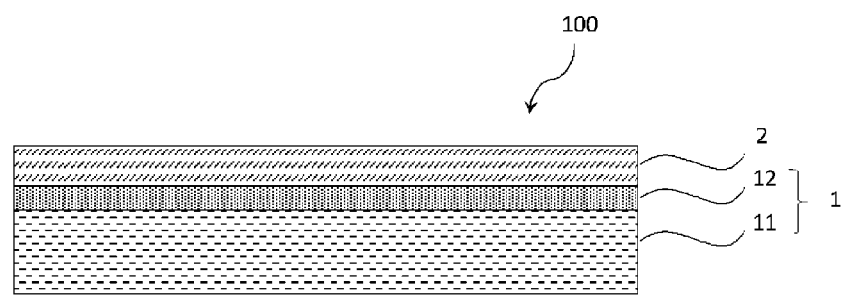
FIG. 1 is a cross-sectional schematic view illustrating an embodiment of a gas barrier film of the present invention.

An active energy ray-curable resin composition of the present invention is characterized by containing: a reaction product (X) of a component (A) and a component (B) below:

(A) at least one selected from the group consisting of meta-xylylenediamine and para-xylylenediamine;

(B) at least one selected from the group consisting of unsaturated carboxylic acids represented by the following general formula (1) and derivatives of the unsaturated carboxylic acids:

[Chem. 3]

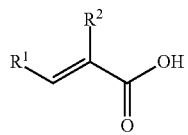

(1)

where, in the formula (1), $R^1$ and $R^2$ each independently represent a hydrogen atom, an alkyl group having from 1 to 8 carbon atoms, an aryl group having from 6 to 12 carbon atoms, or an aralkyl group having from 7 to 13 carbon atoms;

(C) a compound having at least one group selected from the group consisting of a glycidyl group and an isocyanate group, and an ethylenically unsaturated bond-containing group; and (D) a phosphoric acid derivative having an ethylenically unsaturated bond-containing group.

The active energy ray-curable resin composition of the present invention has the above constitution and thus is an active energy ray-curable resin composition that is easy to produce and can form a cured product with excellent gas barrier properties and good adhesion to an inorganic thin film layer. In addition, the active energy ray-curable resin composition has excellent stability over time and thus achieves a small reduction in adhesion of the resulting cured product to an inorganic thin film layer even when the active energy ray-curable resin composition is used after a lapse of time from the preparation. The reason for this is uncertain but assumed as follows.

The active energy ray-curable resin composition of the present invention contains the reaction product (X) of the component (A) and the component (B) (hereinafter, also referred to simply as "the reaction product (X)") and thus exhibits excellent gas barrier properties, adhesion, and film-forming properties. For example, the active energy ray-curable resin composition of the present invention, when applied to a gas barrier film known in the art having an inorganic thin film layer, can further improve the gas barrier properties.

The component (C) is an active energy ray-curable compound having an ethylenically unsaturated bond-containing group. The component (C) has at least one group selected from the group consisting of a glycidyl group and an isocyanate group, and these groups can react with an amino group in the reaction product (X). It is believed that when the reaction of the reaction product (X) and the component (C) proceeds, the ethylenically unsaturated bond-containing group is introduced into the reaction product (X), and a resin composition having even better curability and film-forming properties is formed.

The component (D) is an active energy ray-curable compound having an ethylenically unsaturated bond-containing group and has a phosphoric acid residue, and thus is believed to increase adhesion to an inorganic thin film layer and stability over time. The present inventors have found that use of a well-known adhesion enhancing component, such as a silane coupling agent or a titanate-based coupling agent, cannot provide the effects of the present invention, and the use of the given component (D) can prevent the reduction in adhesion of the resulting cured product to an inorganic thin film layer even when the active energy ray-curable resin composition is used after a lapse of time from the preparation.

In the present specification, the "active energy ray-curable resin composition" means a resin composition that is cured by irradiation of an active energy ray, such as visible light, ultraviolet light, and an electron beam. Among them, the active energy ray-curable resin composition is preferably an ultraviolet light-curable resin composition or an electron beam-curable resin composition, and more preferably an ultraviolet light-curable resin composition.

Hereinafter, each component contained in the active energy ray-curable resin composition will be described.

Reaction Product (X)

The active energy ray-curable resin composition of the present invention contains a reaction product (X) of the component (A) and the component (B) below:

(A) at least one selected from the group consisting of meta-xylylenediamine and para-xylylenediamine;

(B) at least one selected from the group consisting of unsaturated carboxylic acids represented by the following general formula (1) and derivatives of the unsaturated carboxylic acids:

[Chem. 4]

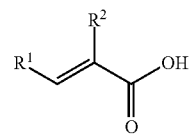

(1)

where, in the formula (1), $R^1$ and $R^2$ each independently represent a hydrogen atom, an alkyl group having from 1 to 8 carbon atoms, an aryl group having from 6 to 12 carbon atoms, or an aralkyl group having from 7 to 13 carbon atoms.

The active energy ray-curable resin composition containing the reaction product (X) is excellent in gas barrier properties, adhesion, and film-forming properties.

The component (A) is used in terms of gas barrier properties and is preferably meta-xylylenediamine in terms of gas barrier properties. One component (A) may be used alone, or two components (A) mixed may be used.

The component (B) is at least one selected from the group consisting of unsaturated carboxylic acids represented by the general formula (1) above and derivatives of the unsaturated carboxylic acids. In terms of gas barrier properties, $R^1$ in the formula (1) is preferably a hydrogen atom or an alkyl group having from 1 to 8 carbon atoms, more preferably a hydrogen atom or an alkyl group having from 1 to 3 carbon atoms, even more preferably a hydrogen atom or a methyl group, and still more preferably a hydrogen atom.

In addition, in terms of gas barrier properties, $R^2$ in Formula (1) is preferably a hydrogen atom or an alkyl group having from 1 to 8 carbon atoms, more preferably a hydrogen atom or an alkyl group having from 1 to 3 carbon atoms, even more preferably a hydrogen atom or a methyl group, and still more preferably a hydrogen atom.

Examples of the derivatives of the unsaturated carboxylic acids represented by the formula (1) include esters, amides, acid anhydrides, and acid chlorides of the unsaturated carboxylic acids. The ester of the unsaturated carboxylic acid is preferably an alkyl ester, and in terms of obtaining good reactivity, the alkyl has preferably from 1 to 6 carbon atoms, more preferably from 1 to 3 carbon atoms, and even more preferably from 1 to 2 carbon atoms.

Examples of the unsaturated carboxylic acids represented by the general formula (1) above and the derivatives of the unsaturated carboxylic acids include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, in terms of obtaining good gas barrier properties, the component (B) is preferably at least one selected from the group consisting of acrylic acid, methacrylic acid, crotonic acid, and derivatives of these acids, and more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, still more preferably alkyl esters of acrylic acid, and still even more preferably methyl acrylate.

One component (B) may be used alone, or two or more in combination may be used.

When an unsaturated carboxylic acid, an ester, or an amide is used as the component (B), the reaction of the component (A) and the component (B) is performed by mixing the component (A) and the component (B) under conditions of 0 to 100° C. and more preferably 0 to 70° C.; and performing Michael addition reaction and an amide group formation reaction by dehydration, dealcoholization, and deamination under conditions of 100 to 300° C. and preferably 130 to 250° C.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

On the other hand, when an acid anhydride or an acid chloride of an unsaturated carboxylic acid is used as the component (B), the reaction is performed by mixing the component (A) and the component (B) under conditions of 0 to 150° C. and preferably 0 to 100° C., and then performing Michael addition reaction and the amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction of the component (A) and the component (B) has high cohesive force, and thus the active energy ray-curable resin composition containing the reaction product (X) of the component (A) and the component (B) and a cured product of the active energy ray-curable resin composition exhibit high gas barrier properties and good adhesion to a substrate film or the like to be described later.

The reaction molar ratio of the component (B) to the component (A) [(B)/(A)] is preferably in a range from 0.3 to 1.0. With the reaction molar ratio of 0.3 or more, a sufficient amount of the amide group is produced in the reaction product (X), exhibiting high levels of gas barrier properties and adhesion. On the other hand, the reaction molar ratio in a range of 1.0 or less provides excellent heat resistance and also excellent solubility in organic solvents and water.

Especially when high gas barrier properties of the resulting active energy ray-curable resin composition and its cured product and excellent cured product performance are taken into consideration, the reaction molar ratio of the component (B) to the component (A) [(B)/(A)] is more preferably in a range of 0.6 to 1.0.

Component (C): Compound Having at Least One Group Selected from the Group Consisting of a Glycidyl Group and an Isocyanate Group, and an Ethylenically Unsaturated Bond-Containing Group The active energy ray-curable resin composition of the present invention contains, as the component (C), a compound having at least one group selected from the group consisting of a glycidyl group and an isocyanate group, and an ethylenically unsaturated bond-containing group. The component (C) is an active energy ray-curable compound having at least one group selected from the group consisting of a glycidyl group and an isocyanate group that can react with an amino group in the reaction product (X), and having an ethylenically unsaturated bond-containing group.

The compound (C) is any compound having at least one group selected from the group consisting of a glycidyl group and an isocyanate group or may have two or more of these groups but is preferably a compound having only one of either a glycidyl group or an isocyanate group.

Examples of the ethylenically unsaturated bond-containing group contained in the component (C) include a (meth)acryloyl group, a vinyl group, and an allyl group, and in terms of active energy ray-curability, a (meth)acryloyl group is preferred. The (meth)acryloyl group means an acryloyl group or a methacryloyl group. The compound (C) is any compound having at least one ethylenically unsaturated bond-containing group or may have two or more ethylenically unsaturated bond-containing groups but is preferably a compound having only one ethylenically unsaturated bond-containing group.

Specific examples of the component (C) include glycidyl (meth)acrylate, 2-isocyanatoethyl (meth)acrylate, 1,1-bis ((meth)acryloyloxymethyl)ethyl isocyanate, and 2-isocyanatoethyloxyethyl (meth)acrylate. One of them alone or two or more in combination can be used. The (meth)acrylate means acrylate or methacrylate.

Among the above, in terms of reactivity with the reaction product (X) and improving gas barrier properties, the component (C) is preferably at least one selected from the group consisting of glycidyl (meth)acrylate and 2-isocyanatoethyl (meth)acrylate, and in terms of reactivity with the reaction product (X) not extremely high and good handleability, and excellent stability over time of the resulting active energy ray-curable resin composition, the component (C) is preferably glycidyl (meth)acrylate.

The content of the component (C) in the active energy ray-curable resin composition is an amount giving a molar ratio of amine active hydrogen in the reaction product (X) to a total of glycidyl groups and isocyanate groups in the component (C) [number of amine active hydrogen in reaction product (X)/total number of glycidyl groups and isocyanate groups in component (C)] of preferably from 0.5 to 10, more preferably from 1 to 8, and even more preferably from 2 to 5. With the molar ratio of 0.5 or more, high gas barrier properties are exhibited, and with the molar ratio of 10 or less, cure shrinkage is small, and the active energy ray-curability is good.

Component (D): Phosphoric Acid Derivative Having Ethylenically Unsaturated Bond-Containing Group The active energy ray-curable resin composition of the present invention contains, as the component (D), a phosphoric acid derivative having an ethylenically unsaturated bond-containing group. The active energy ray-curable composition contains the component (D), and thus this improves the active energy ray-curability and the adhesion of the resulting cured product to an inorganic thin film layer. Furthermore, this can prevent the reduction in adhesion of the resulting cured product to an inorganic thin film layer even when the active energy ray-curable resin composition is used after a lapse of time from the preparation.

Examples of the ethylenically unsaturated bond-containing group contained in the component (D) include a (meth) acryloyl group, a vinyl group, and an allyl group, and in terms of active energy ray-curability, a (meth)acryloyl group is preferred. The compound (D) is any compound having at least one ethylenically unsaturated bond-containing group or may have two or more ethylenically unsaturated bond-containing groups, but is preferably a compound having only one ethylenically unsaturated bond-containing group.

More specifically, the component (D) is preferably a compound represented by the following general formula (2):

[Chem. 5]

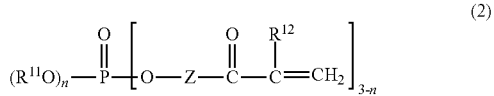

(2)

where, in the formula (2), $R^{11}$ is a hydrogen atom, an alkyl group having from 1 to 12 carbon atoms, or a monovalent group represented by $-(C_mH_{2m})_p-OH$, where m is a number from 1 to 6 and p is a number from 1 to 10; $R^{12}$ is a hydrogen atom or a methyl group; Z is a divalent group represented by $-(C_rH_{2r}O)_q-$, where r is a number from 1 to 6 and q is a number from 1 to 20, or $-R^{13}-COO-(C_rH_{2r}O)_q-$, where $R^{13}$ is an alkylene group having from 1 to 12 carbon atoms and r and q are the same as described above; and n is a number of 0, 1, or 2.

In the general formula (2), $R^{11}$ is a hydrogen atom, an alkyl group having from 1 to 12 carbon atoms, or a monovalent group represented by $-(C_mH_{2m})_p-OH$, where m is a number from 1 to 6 and p is a number from 1 to 10, and is preferably a hydrogen atom.

Examples of the alkyl group having from 1 to 12 carbon atoms in $R^{11}$ include a methyl group, an ethyl group, various propyl groups, various butyl groups, various pentyl groups, various hexyl groups, various heptyl groups, a 2-ethylhexyl group, various octyl groups, various nonyl groups, various decyl groups, various undecyl groups, and various dodecyl groups (lauryl groups). Here, "various" means various isomers including n-, sec-, tert-, and iso-. Among them, an alkyl group having from 1 to 6 carbon atoms is preferred.

In a monovalent group represented by $-(C_mH_{2m})_p-OH$ in $R^{11}$, m is a number from 1 to 6, and p is a number from 1 to 10. m is preferably from 1 to 4, and p is preferably from 1 to 6 and more preferably from 1 to 4.

In the general formula (2), $R^{12}$ is a hydrogen atom or a methyl group and is preferably a methyl group. When n is 0 or 1, a plurality of $R^{12}$ may be identical or different.

In the general formula (2), Z is a divalent group represented by $-(C_rH_{2r}O)_q-$, where r is a number from 1 to 6 and q is a number from 1 to 20, or $-R^{13}-COO-(C_rH_{2r}O)_q-$, where $R^{13}$ is an alkylene group having from 1 to 12 carbon atoms and r and q are the same as described above. r is preferably from 1 to 4 and more preferably from 2 to 3, and q is preferably from 1 to 10, more preferably from 1 to 6, and even more preferably from 1 to 4.

Examples of the alkylene group having from 1 to 12 carbon atoms in $R^{13}$ include a methylene group, an ethylene group, a propylene group, a trimethylene group, a butylene group, a tetramethylene group, a pentylene group, an isopropylidene group, a pentamethylene group, a hexamethylene group, a heptamethylene group, an octamethylene group, an ethylhexylene group, a nonamethylene group, a decamethylene group, and a dodecamethylene group. Among them, the alkylene group is preferably an alkylene group having from 1 to 8 carbon atoms, more preferably an alkylene group having from 2 to 6 carbon atoms, and more preferably at least one selected from the group consisting of an ethylene group, a propylene group, a trimethylene group, a butylene group, a tetramethylene group, a pentylene group, an isopropylidene group, a pentamethylene group, and a hexamethylene group.

In the general formula (2), n is a number of 0, 1, or 2, preferably 1 or 2, and more preferably 2. A mixture of compounds differing in the number of n in the general formula above may be used as the component (D). When the component (D) is a mixture of compounds differing in the number of n, n in the general formula may represent an average value in the mixture.

Specific examples of the preferred component (D) include compounds represented by the following general formula (2-1) and the following general formula (2-2):

[Chem. 6]

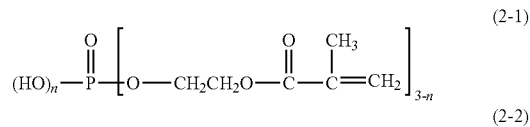
(2-1)

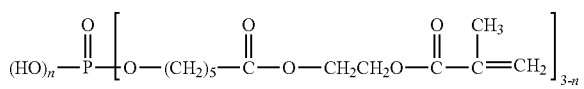
(2-2)

where n is the same as described above.

Commercially available products can be also used as the component (D). Examples include "Light Ester P-1M" and "Light Ester P-2M" available from Kyoeisha Chemical Co., Ltd. and "KAYAMER PM-2" and "KAYAMER PM-21" available from Nippon Kayaku Co., Ltd.

The content of the component (D) in the active energy ray-curable resin composition is preferably from 0.1 to 10 parts by mass, more preferably from 0.3 to 8.0 parts by mass, even more preferably from 0.5 to 8.0 parts by mass, still more preferably from 0.5 to 5.0 parts by mass, still even more preferably from 1.5 to 5.0 parts by mass, still even more preferably from 2.5 to 5.0 parts by mass, still even more preferably from 3.0 to 5.0 parts by mass, and still even more preferably from 3.5 to 5.0 parts by mass relative to 100 parts by mass of the reaction product (X). The content of the component (D) of 0.1 parts by mass or more relative to 100 parts by mass of the reaction product (X) provides good active energy ray-curability and good adhesion of the resulting cured product to an inorganic thin film layer. Furthermore, this can prevent the reduction in adhesion of the resulting cured product to an inorganic thin film layer even when the active energy ray-curable resin composition is used after a lapse of time from the preparation. In addition, with the content of the component (D) of 10 parts by mass or less relative to 100 parts by mass of the reaction product (X), precipitation of a salt formed from the reaction product (X) and the component (D) or the like is unlikely to occur in the resin composition, providing good stability.

Photopolymerization Initiator

When the active energy ray-curable resin composition of the present invention is an ultraviolet light-curable resin composition, the active energy ray-curable resin composition preferably contains a photopolymerization initiator.

Examples of the photopolymerization initiator include at least one photoradical polymerization initiator selected from the group consisting of acetophenone, benzophenone, α-hydroxyalkylphenones, α-aminoalkylphenones, Michler's ketone, benzoin, benzyldimethylketal, benzoylbenzoate, α-acyloxime esters, acylphosphine oxides, and thioxanthones. Among them, the photopolymerization initiator is preferably at least one selected from the group consisting of α-hydroxyalkylphenones, α-aminoalkylphenones, and acylphosphine oxides in terms of curability and low coloration of the resulting cured product, and more preferably α-hydroxyalkylphenones in terms of curability and low coloration of the resulting cured product, and adhesion of the resulting cured product to an inorganic thin film layer.

Examples of the α-hydroxyalkylphenones include 1-hydroxycyclohexyl phenyl ketone ("Irgacure 184" available from BASF), 2-hydroxy-2-methyl-1-phenylpropane-1-one ("Irgacure 1173" available from BASF), 1-[4-(2-hydroxyethoxy)phenyl]-2-hydroxy-2-methyl-1-propane-1-one ("Irgacure 2959" available from BASF), and 2-hydroxy-1-[4-[4-(2-hydroxy-2-methylpropionyl)-benzyl]phenyl]-2-methylpro pane-1-one ("Irgacure 127" available from BASF).

Examples of the α-aminoalkylphenones include 2-methyl-1-[4-[methylthio]phenyl]-2-morpholinopropane-1-one ("Irgacure 907" available from BASF), 2-benzyl-2-(dimethylamino)-4'-morpholinobutyrophenone ("Irgacure 369" and "Irgacure 369E" available from BASF), and 2-dimethylamino-2-(4-methylbenzyl)-1-(4-morpholine-4-yl-phenyl)-butane-1-one ("Irgacure 379EG" available from BASF).

Examples of the α-acyloxime esters include 1,2-octanedione, 1-[4-(phenylthio)phenyl]-,2-(O-benzoyloxime) ("Irgacure OXE01" available from BASF) and ethanone,1-[9-ethyl-6-(2-methylbenzoyl)-9H-carbazole-3-yl]-,1-(O-acetyloxime) ("Irgacure OXE02" available from BASF).

Examples of the acylphosphine oxides include 2,4,6-trimethylbenzoyl-diphenylphosphine oxide ("Irgacure TPO" available from BASF) and bis(2,4,6-trimethylbenzoyl)phenylphosphine oxide ("Irgacure 819" available from BASF).

Examples of the thioxanthones include 2,4-diethylthioxanthone and 2,4-diisopropylthioxanthone.

The above photopolymerization initiators can be used alone or in combination of two or more.

Among the above photopolymerization initiators, in terms of low coloration of the resulting cured product, at least one selected from the group consisting of 1-hydroxycyclohexyl phenyl ketone ("Irgacure 184" available from BASF) and bis(2,4,6-trimethylbenzoyl)phenylphosphine oxide ("Irgacure 819" available from BASF) is more preferred. In addition, in terms of adhesion of the resulting cured product to an inorganic thin film layer, α-hydroxyalkylphenones are preferred, and at least one selected from the group consisting of 1-hydroxycyclohexyl phenyl ketone ("Irgacure 184" available from BASF) and 1-[4-(2-hydroxyethoxy)phenyl]-2-hydroxy-2-methyl-1-propane-1-one ("Irgacure 2959" available from BASF) is more preferred.

In terms of low coloration of the resulting cured product and adhesion of the resulting cured product to an inorganic thin film layer, 1-hydroxycyclohexyl phenyl ketone ("Irgacure 184" available from BASF) is even more preferred.

The content of the photopolymerization initiator in the active energy ray-curable resin composition is preferably from 0.5 to 10 parts by mass, more preferably from 0.8 to 8 parts by mass, and even more preferably from 1 to 5 parts by mass relative to 100 parts by mass of the reaction product (X).

Non-Spherical Inorganic Particle

The active energy ray-curable resin composition of the present invention can further contain a non-spherical inorganic particle. With the active energy ray-curable resin composition containing a non-spherical inorganic particle, adhesion of the resulting cured product to an inorganic thin film layer is less likely to decrease even when the active energy ray-curable resin composition is used after a lapse of time from the preparation. In addition, when a layer formed of a cured product of the active energy ray-curable resin composition containing a non-spherical inorganic particle is formed on an inorganic thin film layer surface of a gas barrier film having the inorganic thin film layer, gas barrier properties and bending resistance can be also improved. Furthermore, the active energy ray-curable resin composition containing a non-spherical inorganic particle can also prevent the occurrence of blocking due to the cured product of the resin composition.

The shape of the non-spherical inorganic particle is any three-dimensional shape other than spherical shape (substantially true spherical shape), and examples include plate shape, scale shape, column shape, chain shape, and fibrous shape. A plurality of plate-shaped or scale-shaped inorganic particles may be laminated in a layer. Among them, in terms of improving gas barrier properties and bending resistance, the inorganic particle is preferably a plate-shaped, scale-shaped, column-shaped, or chain-shaped inorganic particle, more preferably a plate-shaped, scale-shaped, or column-shaped inorganic particle, and even more preferably a plate-shaped or scale-shaped inorganic particle.

Examples of the inorganic substance constituting the non-spherical inorganic particle include silica, alumina, isinglass (mica), talc, aluminum, bentonite, and smectite. Among them, in terms of improving gas barrier properties and bending resistance, the inorganic substance is preferably at least one selected from the group consisting of silica, alumina, and mica, and is more preferably at least one selected from the group consisting of silica and alumina.

The non-spherical inorganic particle may be surface treated as necessary to increase dispersibility in the resin composition and improve the transparency of the resulting cured product and gas barrier film. Among them, the non-spherical inorganic particle is preferably coated with an organic-based material, and in terms of improving gas barrier properties, bending resistance, and transparency, at least one selected from the group consisting of silica and alumina coated with an organic-based material is more preferred. In terms of gas barrier properties and bending resistance, silica coated with an organic-based material is even more preferred, and in terms of transparency, alumina coated with an organic-based material is even more preferred.

The average particle size of the non-spherical inorganic particle is preferably from 1 to 2000 nm, more preferably from 1 to 1500 nm, even more preferably from 1 to 1000 nm, still more preferably from 1 to 800 nm, still even more preferably from 1 to 500 nm, still even more preferably from 5 to 300 nm, still even more preferably from 5 to 200 nm, still even more preferably from 5 to 100 nm, and still even more preferably from 8 to 70 nm. The non-spherical inorganic particle with an average particle size of 1 nm or more is easy to prepare, and the non-spherical inorganic particle with an average particle size of 2000 nm or less provides good gas barrier properties, good bending resistance, and good transparency. Here, the average particle size is the average particle size of the primary particle.

When the non-spherical inorganic particle is plate-shaped, scale-shaped, column-shaped, or fibrous-shaped, the aspect ratio of the non-spherical inorganic particle is preferably from 2 to 700 and more preferably from 3 to 500. With the aspect ratio of 2 or more, good gas barrier properties are easily exhibited. The average particle size and the aspect ratio of the non-spherical inorganic particle are determined, for example, by observing using a scanning electron microscope (SEM) or a transmission electron microscope (TEM) and averaging measured values at three or more points. In addition, the average particle size and the aspect ratio of the non-spherical inorganic particle present in the cured product can be determined, for example, by embedding the gas barrier film with an epoxy resin, then ion milling the film cross-section using an ion milling device to prepare a sample for cross-sectional observation, and observing and measuring the cross-section of the resulting sample in the same manner as described above.

When the average particle size of the non-spherical inorganic particles is less than 100 nm and the measurement of the average particle size by the above method is difficult, the average particle size can also be measured, for example, by the BET method.

The method for producing the non-spherical inorganic particle is not particularly limited, and a well-known method can be used.

In terms of ease of preparation of the non-spherical inorganic particle, ease of blending the non-spherical inorganic particle into the resin composition, and dispersibility of the non-spherical inorganic particle, it is preferred in the present invention to prepare a dispersion liquid of the non-spherical inorganic particle and to blend the dispersion liquid into the resin composition. The dispersion medium of the non-spherical inorganic particle dispersion liquid is not particularly limited, and water or an organic solvent can be used. In terms of dispersibility of the non-spherical inorganic particle, the organic solvent is preferably a polar solvent. Examples include protic polar solvents, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol; aprotic polar solvents, such as N,N-dimethylformamide, N,N-dimethylacetamide, dimethyl sulfoxide, and N-methylpyrrolidone.

In terms of dispersibility of the non-spherical inorganic particle, the dispersion medium is preferably at least one selected from the group consisting of water and a protic polar solvent, and in terms of dispersibility of the particle and miscibility of the dispersion liquid and the resin composition, the dispersion medium is more preferably a protic polar solvent and even more preferably at least one selected from the group consisting of methanol, ethanol, 1-propanol, and 2-propanol.

When a non-spherical inorganic particle is used, the content of the non-spherical inorganic particle in the active energy ray-curable resin composition is preferably from 0.05 to 5.0 parts by mass, more preferably from 0.1 to 3.0 parts by mass, even more preferably from 0.2 to 2.0 parts by mass, and still more preferably from 0.4 to 1.5 parts by mass relative to 100 parts by mass of the reaction product (X). With the content of the non-spherical inorganic particle in the resin composition of 0.05 parts by mass or more relative to 100 parts by mass of the reaction product (X), adhesion of the resulting cured product to an inorganic thin film layer is less likely to decrease even when the active energy ray-curable resin composition is used after a lapse of time from the preparation. In addition, a gas barrier film obtained by using this has good gas barrier properties and good bending resistance improving effect and can prevent occurrence of blocking. Furthermore, the content of 5.0 parts by mass or less provides good transparency.

Coupling Agent

The active energy ray-curable resin composition of the present invention may further contain a coupling agent, such as a silane coupling agent, a titanate-based coupling agent, or an aluminate-based coupling agent, within a range that does not impair the effects of the present invention. Among these coupling agents, in terms of adhesion of the resulting cured product to an inorganic thin film layer, a silane coupling agent is preferred.

Examples of the silane coupling agent include a silane coupling agent having a vinyl group, a silane coupling agent having an amino group, a silane coupling agent having an epoxy group, a silane coupling agent having a (meth)acryl group, and a silane coupling agent having a mercapto group.

Examples of the silane coupling agent having a vinyl group include vinyltrimethoxysilane and vinyltriethoxysilane.

Examples of the silane coupling agent having an amino group include 3-aminopropyltrimethoxysilane, 3-aminopropylmethyldimethoxysilane, 3-aminopropyltriethoxysilane, 3-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, N-phenyl-3-aminopropyltrimethoxysilane, and N-phenyl-3-aminopropylmethyldimethoxysilane.

Examples of the silane coupling agent having an epoxy group include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane.

Examples of the silane coupling agent having a (meth) acryl group include 3-(meth)acryloxypropylmethyldimethoxysilane, 3-(meth)acryloxypropyltrimethoxysilane, 3-(meth)acryloxypropylmethyldiethoxysilane, and 3-(meth)acryloxypropyltriethoxysilane.

Examples of the silane coupling agent having a mercapto group include 3-mercaptopropylmethyldimethoxysilane and 3-mercaptopropyltrimethoxysilane.

One of the silane coupling agents above or two or more in combination can be used. Among the above, in terms of adhesion of the resulting cured product to an inorganic thin film layer, the coupling agent is preferably a silane coupling agent having an epoxy group and more preferably at least one selected from the group consisting of 3-glycidoxypropylmethyldimethoxysilane, 3-glycidoxypropyltrimethoxysilane, 3-glycidoxypropylmethyldiethoxysilane, and 3-glycidoxypropyltriethoxysilane.

When a coupling agent is used, the content of the coupling agent in the active energy ray-curable resin composition is any content within a range that does not impair the effects of the present invention. In terms of adhesion of the resulting cured product to an inorganic thin film layer, the content is preferably from 0.05 to 20 parts by mass, more preferably from 1.0 to 15 parts by mass, even more preferably from 3.0 to 10 parts by mass, and still more preferably from 5.0 to 10 parts by mass relative to 100 parts by mass of the reaction product (X).

Solvent

The active energy ray-curable resin composition of the present invention may further contain a solvent within a range that does not impair the effects of the present invention in terms of adjusting viscosity and improving workability. In terms of dissolving or dispersing the components in the resin composition, the solvent is preferably at least one selected from the group consisting of an alcohol-based solvent and an ester-based solvent, and specific examples will be described later in "Method for producing active energy ray-curable resin composition".

The content of the solvent in the active energy ray-curable resin composition of the present invention is not particularly limited and can be appropriately selected within a range that can adjust to a desired viscosity, but in terms of improving workability, the content is preferably from 1 to 70 mass % and more preferably from 5 to 60 mass %.

Other Components

The active energy ray-curable resin composition may contain an additive, such as a thermosetting resin, a wetting agent, a tackifier, an antifoaming agent, a curing accelerator, an antirust additive, a pigment, and an oxygen scavenger as necessary within a range that does not impair the effects of the present invention. The total content of these additives in the active energy ray-curable resin composition is preferably 10 mass % or less and more preferably from 0.001 to 5 mass %.

In terms of obtaining the effect of the present invention, the total content of the reaction product (X), the component (C), and the component (D) in solids of the active energy ray-curable resin composition is preferably 60 mass % or more, more preferably 70 mass % or more, even more preferably 80 mass % or more, and even more preferably 85 mass % or more, and the upper limit is 100 mass %. "Solids of the active energy ray-curable resin composition" means components excluding water and an organic solvent in the resin composition.

Method for Producing Active Energy Ray-Curable Resin Composition

The active energy ray-curable resin composition of the present invention can be prepared, for example, by blending a given amount each of the reaction product (X), the component (C), the component (D), and an optionally used photopolymerization initiator, dispersion liquid of a non-spherical inorganic particle, and additive, and a solvent, and then stirring and mixing using a well-known method and apparatus.

A method for producing the active energy ray-curable resin composition of the present invention preferably includes: preparing a solution (a) containing the reaction product (X); mixing the component (C) and the component (D) or a solution containing the component (D) to prepare a solution (b); and mixing the solution (a) and the solution (b) (production method 1) in terms of preventing a reduction in adhesion of the resulting cured product to an inorganic thin film layer even when the resin composition is used after a lapse of time from the preparation.

In terms of solubility of the reaction product (X), the solvent used in the solution (a) is preferably at least one selected from the group consisting of an alcohol-based solvent and an ester-based solvent, and is more preferably an alcohol-based solvent.

The alcohol-based solvent is preferably a monohydric alcohol having from 1 to 4 carbon atoms, preferably at least one selected from the group consisting of methanol, ethanol, n-propyl alcohol, isopropyl alcohol, and n-butyl alcohol, more preferably at least one selected from the group consisting of methanol and ethanol, and even more preferably methanol.

The ester-based solvent is preferably an ester compound having from 4 to 8 carbon atoms, preferably at least one selected from the group consisting of ethyl acetate, n-propyl acetate, isopropyl acetate, and butyl acetate, and more preferably ethyl acetate.

The solution (b) is prepared by mixing the component (C) and the component (D) or a solution containing the component (D). In the preparation of the solution (b), a solution containing the component (D) is preferably used. A preferred solvent used in the solution is the same as those exemplified for the solvent used in the solution (a) and is preferably at least one selected from the group consisting of an alcohol-based solvent and an ester-based solvent, and is more preferably an alcohol-based solvent. Among them, at least one selected from the group consisting of methanol and ethanol is even more preferred, and methanol is still more preferred.

In addition, when the non-spherical inorganic particle is used, the method for producing the active energy ray-curable resin composition preferably includes: preparing a solution (a) containing the reaction product (X); mixing the component (C) and the non-spherical inorganic particle or a dispersion liquid of the non-spherical inorganic particle, then adding the component (D) or a solution containing the component (D) to prepare a solution (b'); and mixing the solution (a) and the solution (b') (production method 2). Employing this method can prevent a reduction in adhesion of the resulting cured product to an inorganic thin film layer even when the active energy ray-curable resin composition is used after a lapse of time from the preparation.

In the production method 2, the solvent used in the solution (a) is preferably at least one selected from the group consisting of an alcohol-based solvent and an ester-based solvent, and specific examples are the same as those exemplified in the production method 1.

In the production method 2, an alcohol-based solvent and an ester-based solvent are more preferably used in combination in the solution (a). A preferred combination of the solvents is a mixed solvent of methanol and ethyl acetate.

When an alcohol-based solvent and an ester-based solvent are used in combination, the mixing ratio is not particularly limited, but the mass ratio of an alcohol-based solvent and an ester-based solvent is preferably from 10/90 to 90/10 and more preferably from 20/80 to 80/20.

In the production method 2, in preparing the solution (b'), the component (C) and a dispersion liquid of a non-spherical inorganic particle are preferably mixed in terms of dispersibility of the non-spherical inorganic particle. A preferred aspect of the dispersion liquid of the non-spherical inorganic particle is as described above.

In addition, in the preparation of the solution (b'), the component (D) or a solution containing the component (D) is used. When a dispersion liquid of a non-spherical inorganic particle is used in preparing the solution (b'), it is preferred to mix the component (C) and the dispersion liquid of a non-spherical inorganic particle and then to add the component (D) to prepare the solution (b').

When a solution containing the component (D) is used in the preparation of the solution (b'), a preferred solvent used in the solution is the same as those in the production method 1.

In addition, in the production method 2, the solution (b') is preferably allowed to stand until the viscosity increases and the solution (b') gels and then mixed with the solution (a). The temperature when the solution (b') is allowed to stand is preferably from 10 to 35° C., and the time when the solution (b') is allowed to stand is preferably from 3 to 48 hours. This prevents a reduction in adhesion of the resulting cured product to an inorganic thin film layer even when the active energy ray-curable resin composition is used after a lapse of time from the preparation of the active energy ray-curable resin composition.

In the present invention, "from the preparation of the resin composition" means that after the solution (a) and the solution (b) are mixed in the production method 1 and after the solution (a) and the solution (b') are mixed in the production method 2.

Cured Product

The present invention provides a cured product of the active energy ray-curable resin composition. The cured product has excellent gas barrier properties and has good adhesion to an inorganic thin film layer to be described later. For example, a cured resin layer formed of the cured product functions as a gas barrier layer having excellent gas barrier properties.

The method for forming the cured product by curing the active energy ray-curable resin composition is not particularly limited, and a well-known method can be used. More specifically, the method is described in the method for producing the gas barrier film.

Gas Barrier Film

The gas barrier film of the present invention has a substrate film having an inorganic thin film layer (hereinafter, also referred to simply as a "substrate film") and a cured resin layer formed of a cured product of the active energy ray-curable resin composition (hereinafter, also referred to simply as a "cured resin layer").

The gas barrier film is any gas barrier film having the substrate film and at least one layer of the cured resin layer, but preferably has the cured resin layer on a surface of an inorganic thin film layer side of the substrate film. This forms a film having high gas barrier properties and excellent bending resistance even when the film has an inorganic thin film layer. Materials constituting the gas barrier film of the present invention will be described below.

Substrate Film

The substrate film constituting the gas barrier film of the present invention is a film constituted of a base film and at least one layer of an inorganic thin film layer. The substrate film is any film having an inorganic thin film layer on at least one surface, but in terms of bending resistance and productivity of the gas barrier film, the substrate film preferably has an inorganic thin film layer on only one surface.

Base Film

The base film constituting the substrate film is preferably a transparent plastic film. Examples include polyolefin-based films, such as those of low density polyethylene, high density polyethylene, linear low density polyethylene, and polypropylene; polyester-based films, such as those of polyethylene terephthalate, polyethylene naphthalate, and polybutylene terephthalate; polyamide-based films, such as those of nylon 6, nylon 6,6, and poly meta-xylene adipamide (N-MXD6); polyimide-based films; biodegradable films, such as those of polylactic acid; polyacrylonitrile-based films; poly(meth)acrylic-based films; polystyrene-based films; polycarbonate-based films; ethylene-vinyl acetate copolymer saponified (EVOH)-based films, and polyvinyl alcohol-based films. Among them, in terms of transparency, strength, and heat resistance, the base film is preferably a film selected from the group consisting of a polyolefin-based film, a polyester-based film, a polyamide-based film, and a polyimide-based film, more preferably a polyester-based film, and even more preferably a polyethylene terephthalate (PET) film.

The film may be stretched in a uniaxial direction or biaxial direction.

Inorganic Thin Film Layer

The inorganic thin film layer is provided to impart gas barrier properties to the gas barrier film. The inorganic thin film layer can exhibit high gas barrier properties even with the small thickness and also has good transparency. The inorganic thin film layer is preferably a vapor-deposited inorganic layer formed by a vapor deposition method.

The inorganic substance constituting the inorganic thin film layer is any inorganic substance that can form a gas barrier thin film on the base film by a vapor deposition method, but examples include silicon, aluminum, magnesium, calcium, zinc, tin, nickel, titanium, zirconium, carbon, or oxides, carbides, nitrides, and oxynitrides of these elements. Among them, the inorganic substance is preferably at least one selected from the group consisting of silicon oxides (silica) and aluminum oxides (alumina) in terms of gas barrier properties and preferably silicon oxides in terms of gas barrier properties. On the other hand, the cured resin layer, which is a cured product of the active energy ray-curable resin composition of the present invention, exhibits good adhesion even to an inorganic thin film layer formed of an aluminum oxide although such adhesion has been difficult to achieve in the art. Thus, in terms of effectiveness of the effect of the present invention, the inorganic substance constituting the inorganic thin film layer is preferably an aluminum oxide. One of the inorganic substances above may be used alone, or two or more may be used in combination.

The thickness of the inorganic thin film layer is preferably 5 nm or more in terms of obtaining high gas barrier properties. In addition, in terms of transparency and bending resistance, the thickness is preferably 100 nm or less and more preferably 50 nm or less. The thickness above is a thickness per layer of the inorganic thin film layer.

The method for forming the inorganic thin film layer is not particularly limited, and examples include well-known deposition methods including physical vapor deposition methods, such as a vacuum deposition method, a sputtering method, and an ion plating method; and chemical vapor deposition methods, such as a plasma chemical vapor deposition method, a thermal chemical vapor deposition method, and a photochemical vapor deposition method.

The thickness of the substrate film constituted of the base film and at least one layer of the inorganic thin film layer is preferably from 5 to 300 µm, more preferably from 5 to 100 µm, even more preferably from 8 to 50 µm, and even more preferably from 10 to 40 µm in terms of gas barrier properties and strength.

Cured Resin Layer

The cured resin layer included in the gas barrier film of the present invention is formed of a cured product of the active energy ray-curable resin composition.

The thickness of the cured resin layer is preferably 0.1 μm or more, more preferably 0.2 μm or more, even more preferably 0.5 μm or more, and still more preferably 1.0 μm or more in terms of gas barrier properties and bending resistance. In addition, the thickness is preferably 20 μm or less, more preferably 10 μm or less, even more preferably 8.0 μm or less, still more preferably 5.0 μm or less, and still even more preferably 3.5 μm or less in terms of transparency of the gas barrier film. The thickness above is a thickness per layer of the cured resin layer.

Layer Structure of Gas Barrier Film

The gas barrier film of the present invention is any gas barrier film structured to have the substrate film having an inorganic thin film layer, and at least one layer of the cured resin layer. In terms of obtaining the effects of the present invention, the gas barrier film of the present invention is preferably structured to have an inorganic thin film layer on only one surface of the substrate film and have only one layer of the cured resin layer. In addition, the inorganic thin film layer and the cured resin layer are preferably adjacent to each other.

An example of a preferred layer structure of the gas barrier film includes a structure of FIG. 1. FIG. 1 is a cross-sectional schematic view illustrating an embodiment of the gas barrier film of the present invention. A gas barrier film 100 is structured to have a substrate film 1 having an inorganic thin film layer 12 on one surface, and a cured resin layer 2 provided on a surface on the inorganic thin film layer 12 side. The substrate film 1 includes an inorganic thin film layer 12 formed on one surface of the base film 11. In FIG. 1, the inorganic thin film layer 12 and the cured resin layer 2 are adjacent to each other. In addition, as illustrated in FIG. 1, the gas barrier film of the present invention preferably has no film other than the substrate film.

However, the gas barrier film of the present invention is not limited to the layer structure of FIG. 1 and may have, for example, two or more layers of cured resin layers. In addition, for example, the gas barrier film illustrated in FIG. 1 may be structured to have a primer layer, a protective layer, or the like between the substrate film 1 and the cured resin layer 2 or on the upper surface (the surface not adjacent to the substrate film 1) of the cured resin layer 2.

Method for Producing Gas Barrier Film

A method for producing the gas barrier film of the present invention is not particularly limited, and a well-known method can be used. Examples of the method for producing the gas barrier film of the structure of FIG. 1 include a method of forming a cured resin layer by coating the active energy ray-curable resin composition to a desired thickness on a surface of an inorganic thin film layer side of a substrate film having the inorganic thin film layer formed on one surface of a base film to form an uncured composition layer, and then curing the uncured composition layer by irradiating with an active energy beam, such as ultraviolet light or an electron beam.

Examples of the coating method for coating the active energy ray-curable resin composition include bar coating, Meyer bar coating, air knife coating, gravure coating, reverse gravure coating, micro gravure coating, micro reverse gravure coating, die coating, slot die coating, vacuum die coating, dip coating, spin coating, roll coating, spray coating, and coating with a brush. Among them, bar coating, roll coating, or spray coating is preferred, and gravure coating, reverse gravure coating, micro gravure coating, or micro reverse gravure coating is industrially preferred.

After coating the active energy ray-curable resin composition, a solvent is volatilized as necessary (drying). Conditions in the drying can be appropriately selected, but the drying can be performed, for example, in conditions of a drying temperature of 60 to 180° C. and a drying time of 5 to 180 seconds.

After performing the drying, the active energy ray-curable resin composition is cured by irradiating with an active energy ray, such as ultraviolet light or an electron beam, to form a cured resin layer. For example, in curing by ultraviolet irradiation, a good cured product can be obtained by irradiation of 50 to 2000 mJ/cm$^2$ and preferably of 100 to 1000 mJ/cm$^2$ using a high-pressure mercury lamp, a metal halide lamp, a xenon lamp, a chemical lamp, or the like emitting light in a wavelength range from 150 to 450 nm. The active energy ray may be irradiated in air or in an inert gas atmosphere, such as nitrogen and argon.

Properties of Gas Barrier Film

The gas barrier film of the present invention has excellent gas barrier properties. For example, the oxygen transmission rate of the gas barrier film at 23° C. and a relative humidity of 60% varies with barrier properties of the substrate film used but is preferably 2.0 cc/m$^2$·day·atm or less, more preferably 1.5 cc/m$^2$·day·atm or less, even more preferably 1.0 cc/m$^2$·day·atm or less, and still more preferably 0.8 cc/m$^2$·day·atm or less.

The oxygen transmission rate of the gas barrier film is specifically determined by a method described in Examples.

The gas barrier film of the present invention preferably has little coloration due to yellowing of the active energy ray-curable resin composition after curing. Specifically, the YI value of the gas barrier film is preferably 5.0 or less, more preferably 3.0 or less, even more preferably 2.0 or less, and still more preferably 1.8 or less. In particular, with a YI value of 2.0 or less, the coloration is hardly recognized even visually, which is favorable.

The YI value of the gas barrier film is measured in accordance with JIS K7373:2006 and specifically is determined by a method described in Examples.

Laminate

A laminate of the present invention has the gas barrier film of the present invention and a thermoplastic resin layer. Examples of a preferred structure of the laminate include a structure in which the thermoplastic resin layer is laminated on a surface of the cured resin layer side in the gas barrier film of the present invention (a surface (upper surface) of the cured resin layer 2 side in the gas barrier film 100 of FIG. 1) or on the opposite surface of the cured resin layer 2 side (a surface (lower surface) of the base film 11 side in the gas barrier film 100 of FIG. 1).

The laminate may further include an optional layer, such as a primer layer, an ink layer, an adhesive layer, a surface protective layer, or a vapor-deposited layer, laminated between the gas barrier film and the thermoplastic resin layer. In addition, the laminate of the present invention may have two or more layers each of the gas barrier film and the thermoplastic resin layer of the present invention.

For the thermoplastic resin layer, a thermoplastic resin film is preferably used. The thermoplastic resin film is preferably a transparent plastic film exemplified for the base film constituting the substrate film. The surface of the thermoplastic resin film may be subjected to a surface treatment, such as a flame treatment or a corona discharge treatment. In addition, as the thermoplastic resin film, a film containing an ultraviolet absorber, a colorant, or the like, or a film having a primer layer, an ink layer, a surface protective layer, a vapor-deposited layer, or the like on the surface can also be used.

The thickness of the thermoplastic resin layer is preferably from 10 to 300 µm and is more preferably from 10 to 100 µm.

Examples of a preferred layer structure of the laminate of the present invention include a structure in which the gas barrier film and the thermoplastic resin film are directly laminated and a structure in which the gas barrier film and the thermoplastic resin film are laminated with an adhesive layer interposed between these films. Among them, a structure in which the gas barrier film and the thermoplastic resin film are laminated with an adhesive layer interposed between these films is preferred.

Figure 2:
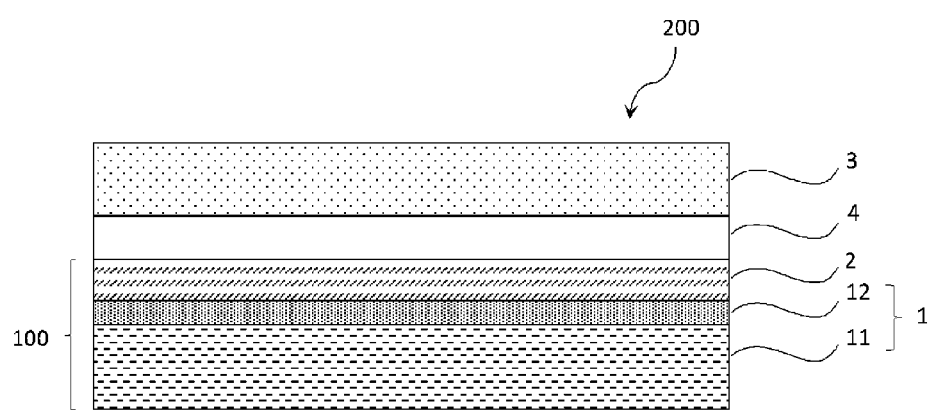
FIG. 2 is a cross-sectional schematic view illustrating an embodiment of a laminate of the present invention.

For the structure in which the gas barrier film and the thermoplastic resin film are laminated with an adhesive layer interposed between these films, these films are preferably laminated with the surface of the cured resin layer side in the gas barrier film and the thermoplastic resin film facing each other. In this case, the layer structure of the laminate is a structure illustrated in FIG. 2. FIG. 2 is a cross-sectional schematic view illustrating an embodiment of the laminate of the present invention. In FIG. 2, a laminate 200 is formed by laminating the gas barrier film 100 and a thermoplastic resin film 3 with an adhesive layer 4 interposed between these films and with the surface of the cured resin layer 2 side in the gas barrier film 100 and the thermoplastic resin film 3 facing each other. The laminate 200 is structured to include the base film 11, the inorganic thin film layer 12, the cured resin layer 2, the adhesive layer 4, and the thermoplastic resin film 3 laminated in this order.

The method for producing the laminate is not particularly limited. Examples of a method for producing a laminate in which the gas-barrier film and the thermoplastic resin film are directly laminated include a method of coating the active energy ray-curable resin composition described above on the surface of the inorganic thin film layer side of the substrate film constituting the gas barrier film, then immediately bonding the thermoplastic resin film to the coated surface using a nip roll or the like, and then curing the active energy ray-curable resin composition by the method described above. In this case, the active energy ray-curable resin composition constituting the cured resin layer also plays a role of adhering the substrate film in the gas-barrier film and the thermoplastic resin film.

Examples of a method for producing a laminate in which the gas-barrier film and the thermoplastic resin film are laminated with an adhesive layer interposed between these films include a method of coating an adhesive that is to constitute the adhesive layer on one surface of the gas-barrier film produced by the method described above or on one surface of the thermoplastic resin film, and then bonding the other film to laminate the film.

As the adhesive constituting the adhesive layer, a well-known adhesive, such as a urethane-based adhesive, an acrylic-based adhesive, or an epoxy-based adhesive, can be used. In addition, the thickness of the adhesive layer is not particularly limited, but in terms of achieving both adhesion and transparency, the thickness is preferably from 0.1 to 30 µm, more preferably from 1 to 20 µm, and even more preferably from 2 to 20 µm.

Applications

The gas barrier film and laminate of the present invention are excellent in gas barrier properties and bending resistance and thus are suitable for packaging material applications for protecting food products, pharmaceuticals, cosmetics, precision electronic components, or the like. When used as a packaging material, the gas barrier film and laminate of the present invention may be used as they are as packaging materials or may be further laminated with another layer or film and used.

EXAMPLES

Then, the present invention will be described specifically with reference to examples. However, the present invention is not limited in any way by these examples.

Measurements and evaluations in the present examples were performed by the following methods.

Thickness of Cured Resin Layer

The thickness was measured using a multilayer film thickness measuring device ("DC-8200" available from Gunze Limited).

Peel Strength (g/15 mm) of Laminate

The peel strength of the laminate was measured by a T-peel test at a peel rate of 300 mm/min in accordance with JIS K6854-3:1999.

Oxygen Transmission Rate (Cc/m$^2$·Day·Atm)

The oxygen transmission rate of the film was measured using an oxygen transmission rate measuring device ("OX-TRAN 2/21" available from Modern Controls Inc.) under conditions of 23° C. and a relative humidity of 60%.

YI Value

The YI value was measured in accordance with JIS K7373:2006 using a device for simultaneous measurement of color and turbidity ("COH 400" available from Nippon Denshoku Industries Co., Ltd.).

Production Example 1 (Production of Reaction Product (X1) of Meta-Xylylenediamine and Methyl Acrylate)

A reaction vessel was charged with 1 mol of meta-xylylenediamine. The temperature was raised to 60° C. under a nitrogen stream, and 0.93 mol of methyl acrylate was added dropwise over 1 hour. The temperature was raised to 165° C. while generated methanol was distilled off, and then the temperature was maintained at 165° C. for 2.5 hours. An appropriate amount of methanol was added dropwise over 1.5 hours to make a solid concentration 65%, and a reaction product (X1) of meta-xylylenediamine and methyl acrylate was obtained.

Production of Active Energy Ray-Curable Resin Composition, Preparations of Gas Barrier Film and Laminate, and Adhesion Evaluation Example 1

Production of Active Energy Ray-Curable Resin Composition A

A solution (a) was prepared by dissolving 413 g of the reaction product (X1) obtained in Production Example 1 and 10.5 g of a photopolymerization initiator 1-[4-(2-hydroxyethoxy)-phenyl]-2-hydroxy-2-methyl-1-propane-1-one ("Irgacure 2959" available from BASF) in 505 g of methanol. Then, a solution (b) was prepared by diluting 10.5 g of 2-methacryloyloxyethyl acid phosphate ("Light Ester P-1M" available from Kyoeisha Chemical Co., Ltd.) as a component (D) with 21.1 g of methanol and then adding and dissolving 81.3 g of glycidyl methacrylate (GMA) as a component (C) (an amount giving a molar ratio of amine active hydrogen in the reaction product (X1) to glycidyl groups in GMA of 3). An active energy ray-curable resin composition A was prepared by mixing the solution (a) and the solution (b).

In the preparation of the resin composition, the time point when the solution (a) and the solution (b) were mixed was taken as "0 hr after preparing the composition". Gas barrier films and laminates were prepared using the resin compositions after a lapse of 0 hr and/or 2 hr from the preparation and used for evaluations in the following manners.

Preparation and Evaluation of Gas Barrier Film

As substrate films, an alumina vapor-deposited PET ("Barrialox 1011HG (non-coated)" available from Toray Advanced Film Co., Ltd., a thickness of 12 μm) in which an aluminum oxide (alumina) is vapor-deposited on one surface of PET and a silica vapor-deposited PET ("Techbarrier L" available from Mitsubishi Plastics, Inc., a thickness of 12 μm) in which a silicon oxide (silica) is vapor-deposited on one surface of PET were used. The active energy ray-curable resin composition A (0 hr after preparation) was coated on the alumina vapor-deposited surface and the silica vapor-deposited surface of each substrate film using a bar coater No. 4 and dried at 120° C. for 60 seconds, and uncured composition layers were formed. Furthermore, each uncured composition layer was cured by ultraviolet irradiation using a conveyor type ultraviolet irradiation device U-0303 (available from GS Yuasa International Ltd., using a high-pressure mercury lamp, a lamp output of 80 W/cm and a conveyor speed of 3 m/min) set to an integrated light quantity of 200 mJ/cm$^2$, and gas barrier films with the structure of FIG. 1 having a cured resin layer with a thickness shown in Table 1 on the vapor-deposited surface of each substrate film were obtained.

Using the resulting gas barrier films, the oxygen transmission rate was measured by the method described above. The results are shown in Table 1.

Preparation and Evaluation of Laminate

As substrate films, the same alumina vapor-deposited PET and silica vapor-deposited PET were used. The active energy ray-curable resin compositions A (0 hr and 2 hr after preparation) were each coated on the alumina vapor-deposited surface and the silica vapor-deposited surface of each substrate film using a bar coater No. 4 and dried at 120° C. for 60 seconds, and uncured composition layers were formed. Immediately after the formation, each uncured composition layer was cured by ultraviolet irradiation using a conveyor type ultraviolet irradiation device U-0303 (available from GS Yuasa International Ltd., using a high-pressure mercury lamp, a lamp output of 80 W/cm and a conveyor speed of 3 m/min) set to an integrated light quantity of 200 mJ/cm$^2$, and gas barrier films having a cured resin layer on the vapor-deposited surface of each substrate film were obtained. A urethane adhesive ("TOMOFLEX AD-502" available from Toyo-Moton Ltd.) was coated on the cured resin layer of each gas barrier film using a bar coater No. 12 and dried at 80° C. for 10 seconds, and an adhesive layer was formed. The urethane adhesive used was prepared by adding 1.05 g of a curing agent CAT-RT85 and 16.9 g of ethyl acetate as a solvent to 15 g of a primary agent AD-502 and stirring the mixture well. A polypropylene film with a thickness of 50 μm ("P1146" available from Toyobo Co., Ltd.) was bonded over the adhesive layer with a nip roll, and laminates with the structure of FIG. 2 were obtained.

Using the resulting laminates, the peel strength of each laminate was measured by the method described above. The results are shown in Table 1.

Example 2

Production of Active Energy Ray-Curable Resin Composition B

A solution (a) was prepared by dissolving 413 g of the reaction product (X1) obtained in Production Example 1 and 10.5 g of a photopolymerization initiator 1-[4-(2-hydroxyethoxy)-phenyl]-2-hydroxy-2-methyl-1-propane-1-one ("Irgacure 2959" available from BASF) in a mixed solvent of 180 g of methanol and 325 g of ethyl acetate. Then, 81.3 g of glycidyl methacrylate (GMA) as a component (C) (an amount giving a molar ratio of amine active hydrogen in the reaction product (X1) to glycidyl groups in GMA of 3) was prepared, and 23.5 g of a dispersion liquid of a plate-shaped alumina particle coated with an organic-based coating ("KOS-A2EOK5-10" available from Kawaken Fine Chemicals Co., Ltd., an ethanol dispersion liquid, a solid concentration of 10 mass % and an average primary particle size of the alumina particle of 20 nm) was added and dispersed by stirring the mixture well. To the mixture, 10.5 g of 2-methacryloyloxyethyl acid phosphate ("Light Ester P-1M" available from Kyoeisha Chemical Co., Ltd.) as a component (D) was added and mixed, and a solution (b') was prepared.

The solution (b') was allowed to stand for about 1 day in an environment of 23° C. and 60% R.H. until the viscosity of the solution (b') increased and the solution (b') gelled, then mixed with the solution (a), and an active energy ray-curable resin composition B was prepared. In the preparation of the resin composition B, the time point when the solution (a) and the solution (b') were mixed was taken as "0 hr after preparing the composition". Gas barrier films and laminates were prepared using the resin compositions after a lapse of 0 hr and/or 2 hr from the preparation and used for evaluations.

Preparation and Evaluation of Gas Barrier Film and Laminate

Gas barrier films and laminates were prepared by the same methods as in Example 1 except for using the active energy ray-curable resin compositions B, and the evaluations were performed. The results are shown in Table 1.

Example 3 (Production and Evaluation of Active Energy Ray-Curable Resin Composition C)

An active energy ray-curable resin composition C was prepared by the same method as in Example 2 except for using 10.5 g of a compound of the following general formula (2-2), where n is 1.5 ("KAYAMER PM-21" available from Nippon Kayaku Co., Ltd.), as a component (D) in place of "Light Ester P-1M" in Example 2.

[Chem. 7]

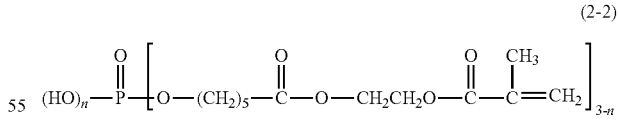

(2-2)

In addition, using the resulting resin compositions, gas barrier films and laminates were prepared by the same methods as in Example 2, and the evaluations were performed. The results are shown in Table 1.

Comparative Example 1 (Production and Evaluation of Comparative Active Energy Ray-Curable Resin Composition A)

A comparative active energy ray-curable resin composition A was prepared by the same method as in Example 1 except for using 10.5 g of a silane coupling agent 3-glycidoxypropyltriethoxysilane ("KBE-403" available from Shin-Etsu Chemical Co., Ltd.) in place of "Light Ester P-1M" as the component (D) in Example 1.

In addition, using the resulting resin compositions, gas barrier films and laminates were prepared by the same methods as in Example 1, and the evaluations were performed. The results are shown in Table 1.

Comparative Example 2 (Production and Evaluation of Comparative Active Energy Ray-Curable Resin Composition B)

A comparative active energy ray-curable resin composition B was prepared by the same method as in Example 2 except for using 10.5 g of a silane coupling agent 3-glycidoxypropyltriethoxysilane ("KBE-403" available from Shin-Etsu Chemical Co., Ltd.) in place of "Light Ester P-1M" as the component (D) in Example 2.

In addition, using the resulting resin compositions, gas barrier films and laminates were prepared by the same methods as in Example 2, and the evaluations were performed. The results are shown in Table 1.

Comparative Example 3 (Production and Evaluation of Comparative Active Energy Ray-Curable Resin Composition C)

A comparative active energy ray-curable resin composition C was prepared by the same method as in Example 1 except for using 10.5 g of a titanate-based coupling agent $(C_8H_{17}O)_4Ti.[P(OC_{19}H_{39})_2OH]_2$ ("PLENACT 46B" available from Ajinomoto Fine-Techno Co., Inc.) in place of "Light Ester P-1M" as the component (D) in Example 1.

In addition, using the resulting resin compositions, gas barrier films and laminates were prepared by the same methods as in Example 1, and the evaluations were performed. The results are shown in Table 1.

Comparative Example 4 (Production and Evaluation of Comparative Active Energy Ray-Curable Resin Composition D)

A comparative active energy ray-curable resin composition D was prepared by the same method as in Example 2 except for using 10.5 g of a titanate-based coupling agent $(C_8H_{17}O)_4Ti.[P(OC_{19}H_{39})_2OH]_2$ ("PLENACT 46B" available from Ajinomoto Fine-Techno Co., Inc.) in place of "Light Ester P-1M" as the component (D) in Example 2.

In addition, using the resulting resin compositions, gas barrier films and laminates were prepared by the same methods as in Example 2, and the evaluations were performed. The results are shown in Table 1.

Comparative Example 5 (Production and Evaluation of Comparative Active Energy Ray-Curable Resin Composition E)

A comparative active energy ray-curable resin composition E was prepared by the same method as in Example 1 except for not using "Light Ester P-1M" as the component (D) in Example 1.

Using the resulting resin compositions and using the alumina vapor-deposited PET as a substrate film, gas barrier films and laminates were prepared by the same methods as in Example 1, and the evaluations were performed. The results are shown in Table 1.

Example 4 (Production and Evaluation of Active Energy Ray-Curable Resin Composition D)

An active energy ray-curable resin composition D was prepared by the same method as in Example 1 except for using 1-hydroxycyclohexyl phenyl ketone ("Irgacure 184" available from BASF) in place of the photopolymerization initiator 1-[4-(2-hydroxyethoxy)-phenyl]-2-hydroxy-2-methyl-1-propane-1-one ("Irgacure 2959" available from BASF) in Example 1.

Using the resulting resin compositions and using the alumina vapor-deposited PET as a substrate film, gas barrier films and laminates were prepared by the same methods as in Example 1, and the evaluations were performed. The results are shown in Table 1.

Example 5 (Production and Evaluation of Active Energy Ray-Curable Resin Composition E)

An active energy ray-curable resin composition E was prepared by the same method as in Example 2 except for using 1-hydroxycyclohexyl phenyl ketone ("Irgacure 184" available from BASF) in place of the photopolymerization initiator 1-[4-(2-hydroxyethoxy)-phenyl]-2-hydroxy-2-methyl-1-propane-1-one ("Irgacure 2959" available from BASF) in Example 2.

Using the active energy ray-curable resin compositions E after a lapse of 0 hr, 2 hr, and 4 hr from the preparation and using the alumina vapor-deposited PET as a substrate film, gas barrier films and laminates were prepared by the same methods as in Example 2, and the evaluations were performed. The results are shown in Table 1.

Example 6 (Production and Evaluation of Active Energy Ray-Curable Resin Composition F)

A solution (a) was prepared by dissolving 413 g of the reaction product (X1) obtained in Production Example 1 and 10.5 g of a photopolymerization initiator 1-hydroxycyclohexyl phenyl ketone ("Irgacure 184" available from BASF) in 505 g of methanol. Then, a solution (b) was prepared by diluting 10.5 g of 2-methacryloyloxyethyl acid phosphate ("Light Ester P-1M" available from Kyoeisha Chemical Co., Ltd.) as a component (D) with 21.1 g of methanol, and to this solution, adding 23.5 g of a silane coupling agent 3-glycidoxypropyltriethoxysilane ("KBE-403" available from Shin-Etsu Chemical Co., Ltd.), and mixing and dissolving 81.3 g of glycidyl methacrylate (GMA) as a component (C) (an amount giving a molar ratio of amine active hydrogen in the reaction product (X1) to glycidyl groups in GMA of 3). An active energy ray-curable resin composition F was prepared by mixing the solution (a) and the solution (b).

Using the active energy ray-curable resin compositions F after a lapse of 0 hr, 2 hr, and 4 hr from the preparation, gas barrier films and laminates were prepared by the same methods as in Example 4, and the evaluations were performed. The results are shown in Table 1.

Comparative Example 6 (Production and Evaluation of Comparative Active Energy Ray-Curable Resin Composition F)

A comparative active energy ray-curable resin composition F was prepared by the same method as in Example 4 except for not using "Light Ester P-1M" as the component (D) in Example 4.

Using the resulting resin compositions, gas barrier films and laminates were prepared by the same methods as in Example 4, and the evaluations were performed. The results are shown in Table 1.

Example 7 (Production and Evaluation of Active Energy Ray-Curable Resin Composition G)

An active energy ray-curable resin composition G was prepared by the same method as in Example 4 except for using 88.8 g of 2-isocyanatoethyl methacrylate (IM) (an amount giving a molar ratio of amine active hydrogen in the reaction product (X1) to isocyanatoethyl groups in 2-isocyanatoethyl methacrylate of 3) in place of 81.3 g of glycidyl methacrylate (GMA) as the component (C) in Example 4.

Using the resulting resin compositions, gas barrier films and laminates were prepared by the same methods as in Example 4, and the evaluations were performed. The results are shown in Table 1.

Example 8 (Production and Evaluation of Active Energy Ray-Curable Resin Composition H)

An active energy ray-curable resin composition H was prepared by the same method as in Example 5 except for using 88.8 g of 2-isocyanatoethyl methacrylate (IM) (an amount giving a molar ratio of amine active hydrogen in the reaction product (X1) to isocyanatoethyl groups in isocyanatoethyl methacrylate of 3) in place of 81.3 g of glycidyl methacrylate (GMA) as the component (C) in Example 5.

Using the resulting resin compositions, gas barrier films and laminates were prepared by the same methods as in Example 5, and the evaluations were performed. The results are shown in Table 1.

Comparative Example 7 (Production and Evaluation of Comparative Active Energy Ray-Curable Resin Composition G)

A comparative active energy ray-curable resin composition G was prepared by the same method as in Example 7 except for not using "Light Ester P-1M" as the component (D) in Example 7.

Using the resulting resin compositions, gas barrier films and laminates were prepared by the same methods as in Example 7, and the evaluations were performed. The results are shown in Table 1.

Reference Example

Substrate films, an alumina vapor-deposited PET ("Barrialox 1011HG (non-coated)" available from Toray Advanced Film Co., Ltd., a thickness of 12 μm) and a silica vapor-deposited PET ("Techbarrier L" available from Mitsubishi Plastics, Inc., a thickness of 12 μm), each alone were measured for oxygen transmission rate. The results are shown in Table 1.

TABLE 1

| | Active energy ray-curable resin composition | | | | |
|---|---|---|---|---|---|
| | (X) | (C) | | (D) | |
| | Reaction product No. | Type | Composition molar ratio *1) | Product name | parts by mass *2) |
| Example 1 | X1 | GMA | 3 | Light Ester P-1M | 3.9 |
| Example 2 | X1 | GMA | 3 | Light Ester P-1M | 3.9 |
| Example 3 | X1 | GMA | 3 | KAYAMERPM-21 | 3.9 |
| Comparative Example 1 | X1 | GMA | 3 | — | — |
| Comparative Example 2 | X1 | GMA | 3 | — | — |
| Comparative Example 3 | X1 | GMA | 3 | — | — |
| Comparative Example 4 | X1 | GMA | 3 | — | — |
| Comparative Example 5 | X1 | GMA | 3 | — | — |
| Example 4 | X1 | GMA | 3 | Light Ester P-1M | 3.9 |
| Example 5 | X1 | GMA | 3 | Light Ester P-1M | 3.9 |
| Example 6 | X1 | GMA | 3 | Light Ester P-1M | 3.9 |
| Comparative Example 6 | X1 | GMA | 3 | — | — |
| Example 7 | X1 | IM | 3 | Light Ester P-1M | 3.9 |
| Example 8 | X1 | IM | 3 | Light Ester P-1M | 3.9 |
| Comparative Example 7 | X1 | IM | 3 | — | — |
| Reference Example *4) | — | — | — | — | — |

| | Active energy ray-curable resin composition | | | | | |
|---|---|---|---|---|---|---|
| | Photopolymerization initiator | | Non-spherical inorganic particle | | Coupling agent | |
| | Product name | parts by mass *2) | Type | parts by mass *2) | Product name | parts by mass *2) |
| Example 1 | Irgacure 2959 | 3.9 | — | — | — | — |
| Example 2 | Irgacure 2959 | 3.9 | Plate-shaped alumina particle | 0.87 | — | — |

TABLE 1-continued

| | | | | | | |
|---|---|---|---|---|---|---|
| Example 3 | Irgacure 2959 | 3.9 | Plate-shaped alumina particle | 0.87 | — | — |
| Comparative Example 1 | Irgacure 2959 | 3.9 | — | — | KBE-403 | 3.9 |
| Comparative Example 2 | Irgacure 2959 | 3.9 | Plate-shaped alumina particle | 0.87 | KBE-403 | 3.9 |
| Comparative Example 3 | Irgacure 2959 | 3.9 | — | — | PLENACT 46B | 3.9 |
| Comparative Example 4 | Irgacure 2959 | 3.9 | Plate-shaped alumina particle | 0.87 | PLENACT 46B | 3.9 |
| Comparative Example 5 | Irgacure 2959 | 3.9 | — | — | — | — |
| Example 4 | Irgacure 184 | 3.9 | — | — | — | — |
| Example 5 | Irgacure 184 | 3.9 | Plate-shaped alumina particle | 0.87 | — | — |
| Example 6 | Irgacure 184 | 3.9 | — | — | KBE-403 | 8.7 |
| Comparative Example 6 | Irgacure 184 | 3.9 | — | — | — | — |
| Example 7 | Irgacure 184 | 3.9 | — | — | — | — |
| Example 8 | Irgacure 184 | 3.9 | Plate-shaped alumina particle | 0.87 | — | — |
| Comparative Example 7 | Irgacure 184 | 3.9 | — | — | — | — |
| Reference Example *4) | — | — | — | — | — | — |

| | Oxygen transmission rate of gas barrier film (0 hr after preparing composition) | | | |
|---|---|---|---|---|
| | Substrate film: alumina vapor-deposited PET | | Substrate film: silica vapor-deposited PET | |
| | Cured layer thickness μm | Oxygen transmission rate *3) | Cured layer thickness μm | Oxygen transmission rate *3) |
| Example 1 | 1.25 | — | 1.46 | 0.16 |
| Example 2 | 1.27 | 0.74 | 1.34 | 0.21 |
| Example 3 | 1.17 | — | 1.21 | 0.33 |
| Comparative Example 1 | 1.38 | 1.10 | 1.28 | 0.09 |
| Comparative Example 2 | 1.30 | 1.06 | 1.24 | 0.12 |
| Comparative Example 3 | 1.32 | 1.30 | 1.45 | 0.09 |
| Comparative Example 4 | 1.27 | 0.79 | 1.37 | 0.08 |
| Comparative Example 5 | 1.47 | 1.66 | — | — |
| Example 4 | 0.84 | 0.98 | — | — |
| Example 5 | 1.20 | 0.90 | — | — |
| Example 6 | 1.76 | 1.25 | — | — |
| Comparative Example 6 | 1.57 | 0.91 | — | — |
| Example 7 | 1.30 | — | — | — |
| Example 8 | 1.25 | — | — | — |
| Comparative Example 7 | 1.34 | — | — | — |
| Reference Example *4) | — | 2.2 | — | 0.5 |

| | Laminate peel strength | | | | |
|---|---|---|---|---|---|
| | Substrate film: alumina vapor-deposited PET | | | Substrate film: silica vapor-deposited PET | |
| | 0 hr after preparing composition | 2 hr after preparing composition | 4 hr after preparing composition g/15 mm | 0 hr after preparing composition | 2 hr after preparing composition |
| Example 1 | 434 | 179 | — | 618 | 525 |
| Example 2 | 489 | 585 | — | 526 | 587 |
| Example 3 | 592 | 533 | — | 436 | 393 |

TABLE 1-continued

| | | | | | |
|---|---|---|---|---|---|
| Comparative Example 1 | 315 | 125 | — | 382 | 118 |
| Comparative Example 2 | 321 | 175 | — | 398 | 393 |
| Comparative Example 3 | 326 | 109 | — | 464 | 57 |
| Comparative Example 4 | 233 | 134 | — | 336 | 143 |
| Comparative Example 5 | 187 | 103 | — | — | — |
| Example 4 | 584 | 335 | — | — | — |
| Example 5 | 561 | 542 | 476 | — | — |
| Example 6 | 564 | 326 | 486 | — | — |
| Comparative Example 6 | 208 | 80 | — | — | — |
| Example 7 | 685 | 720 | — | — | — |
| Example 8 | 750 | 635 | — | — | — |
| Comparative Example 7 | 225 | 525 | — | — | — |
| Reference Example *4) | — | — | — | — | — |

*1) Molar ratio of amine active hydrogen in the reaction product (X) to a total of glycidyl groups and isocyanate groups in the component (C)
*2) Mass parts of an active component relative to 100 parts by mass of the reaction product (X)
*3) cc/m² · day · atm
*4) Oxygen transmission rate of the substrate film only As shown in Table 1, gas barrier films having a cured resin layer formed of a cured product of the active energy ray-curable resin composition of the present invention on a substrate film having an inorganic thin film layer have excellent gas barrier properties. In addition, laminates having a cured resin layer formed of a cured product of the active energy ray-curable resin composition of the present invention have good adhesion to an inorganic thin film layer and has a small reduction in the adhesion even when the resin composition after a lapse of 2 hr from the preparation is used. In particular, comparison of Example 1 and Examples 2 and 3 and comparison of Example 4 and Example 5 reveals that in the resin compositions of Examples 2, 3, and 5 that contain a non-spherical inorganic particle, a degree of reduction in adhesion to an inorganic thin film layer is low even when the resin composition after a lapse of 2 hr from the preparation is used, and in Example 2, the adhesion is improved rather than reduced when the resin composition after a lapse of 2 hr from the preparation is used.

Coloration Evaluation of Gas Barrier Film

Using the resin compositions after 0 hr from the preparation obtained in Examples 2 and 5 and using the alumina vapor-deposited PET ("Barrialox 1011HG (non-coated)" available from Toray Advanced Film Co., Ltd., a thickness of 12 μm) as a substrate film, gas barrier films were prepared by the method described above, and YI values were measured.

In addition, as a reference example, a YI value of the alumina vapor-deposited PET as a substrate film alone was measured. The results above are shown in Table 2. The smaller the YI value, the less coloration is, and in particular, with a YI value of 2.0 or less, the coloration is hardly recognized even visually, which is favorable.

Example 9 (Production and Evaluation of Active Energy Ray-Curable Resin Composition I)

An active energy ray-curable resin composition I was prepared by the same method as in Example 2 except for using bis(2,4,6-trimethylbenzoyl)phenylphosphine oxide ("Irgacure 819" available from BASF) in place of the photopolymerization initiator 1-[4-(2-hydroxyethoxy)-phenyl]-2-hydroxy-2-methyl-1-propane-1-one ("Irgacure 2959" available from BASF) in Example 2.

Using the active energy ray-curable resin composition I after a lapse of 0 hr from the preparation and using the alumina vapor-deposited PET as a substrate film, a gas barrier film was prepared by the same method as in Example 2, and a YI value was measured by the method described above. The results are shown in Table 2.

Example 10 (Production and Evaluation of Active Energy Ray-Curable Resin Composition J)

An active energy ray-curable resin composition J was prepared by the same method as in Example 2 except for using 2-dimethylamino-2-(4-methylbenzyl)-1-(4-morpholine-4-yl-phenyl)-butane-1-one ("Irgacure 379EG" available from BASF) in place of the photopolymerization initiator 1-[4-(2-hydroxyethoxy)-phenyl]-2-hydroxy-2-methyl-1-propane-1-one ("Irgacure 2959" available from BASF) in Example 2.

Using the active energy ray-curable resin composition J after 0 hr from the preparation and using the alumina vapor-deposited PET as a substrate film, a gas barrier film was prepared by the same method as in Example 2, and a YI value was measured by the method described above. The results are shown in Table 2.

TABLE 2

| | Active energy ray-curable resin composition | | | | | | | | | Gas barrier film Substrate film: alumina vapor-deposited PET | |
|---|---|---|---|---|---|---|---|---|---|---|---|
| | (X) Reaction product No. | (C) Composition | | (D) | | Photopolymerization initiator | | Non-spherical inorganic particle | | Cured layer | |
| | | Type | molar ratio *1) | Product name | parts by mass *2) | Product name | parts by mass *2) | Type | parts by mass *2) | thickness μm | YI |
| Example 2 | X1 | GMA | 3 | Light Ester P-1M | 3.9 | Irgacure 2959 | 3.9 | Plate-shaped alumina particle | 0.87 | 1.27 | 4.06 |
| Example 5 | X1 | GMA | 3 | Light Ester P-1M | 3.9 | Irgacure 184 | 3.9 | Plate-shaped alumina particle | 0.87 | 1.20 | 1.85 |
| Example 9 | X1 | GMA | 3 | Light Ester P-1M | 3.9 | Irgacure 819 | 3.9 | Plate-shaped alumina particle | 0.87 | 1.44 | 1.90 |
| Example 10 | X1 | GMA | 3 | Light Ester P-1M | 3.9 | Irgacure 379EG | 3.9 | Plate-shaped alumina particle | 0.87 | 1.43 | 6.01 |
| Reference Example *3) | — | — | — | — | — | — | — | — | — | — | 1.27 |

*1) Molar ratio of amine active hydrogen in the reaction product (X) to glycidyl groups in the component (C)
*2) Mass parts of an active component relative to 100 parts by mass of the reaction product (X)
*3) YI of the substrate film only As is clear from Table 2, the resin composition of Example 5 using 1-hydroxycyclohexyl phenyl ketone as a photopolymerization initiator and the resin composition of Example 9 using bis(2,4,6-trimethylbenzoyl)phenylphosphine oxide as a photopolymerization initiator enables the production of a gas barrier film with less coloration.

INDUSTRIAL APPLICABILITY

The active energy ray-curable resin composition of the present invention has good gas barrier properties and good adhesion to an inorganic thin film layer, and can form a gas barrier cured product having excellent performance in a short time, the cured product having good gas barrier properties and good adhesion to an inorganic thin film layer. Thus, the active energy ray-curable resin composition of the present invention can further improve gas barrier properties of gas barrier films known in the art having an inorganic thin film layer. In addition, the active energy ray-curable resin composition is easy to produce and has excellent stability over time and thus achieves a small reduction in adhesion of the resulting cured product to an inorganic thin film layer even when the resin composition is used after a lapse of time from the preparation. Thus, the active energy ray-curable resin composition of the present invention is also industrially useful.

The gas barrier film and laminate having a layer formed of a cured product of the active energy ray-curable resin composition of the present invention are suitable, for example, for packaging material applications.

REFERENCE SIGNS LIST

100 Gas barrier film
1 Substrate film
11 Base film
12 Inorganic thin film layer
2 Cured resin layer
3 Thermoplastic resin film (thermoplastic resin layer)
4 Adhesive layer
200 Laminate

The invention claimed is:
1. An active energy ray-curable resin composition comprising:
a reaction product (X) of a component (A) and a component (B) below:
(A) at least one selected from the group consisting of meta-xylylenediamine and para-xylylenediamine;
(B) at least one selected from the group consisting of unsaturated carboxylic acids represented by the following general formula (1) and derivatives of the unsaturated carboxylic acids:

[Chem. 1]

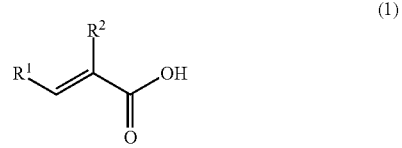

(1)

wherein, in the formula (1), $R^1$ and $R^2$ each independently represent a hydrogen atom, an alkyl group having from 1 to 8 carbon atoms, an aryl group having from 6 to 12 carbon atoms, or an aralkyl group having from 7 to 13 carbon atoms;
(C) a compound comprising at least one group selected from the group consisting of a glycidyl group and an isocyanate group, and an ethylenically unsaturated bond-containing group; and
(D) a phosphoric acid derivative comprising an ethylenically unsaturated bond-containing group;
having contents of (C) and (X) that provide a molar ratio of (number of amine active hydrogen in reaction product (X))/(total number of glycidyl groups and isocyanate groups in component (C)) from 0.5 to 10.

2. The active energy ray-curable resin composition according to claim 1, wherein the component (B) is at least one selected from the group consisting of acrylic acid, methacrylic acid, crotonic acid, and derivatives thereof.

3. The active energy ray-curable resin composition according to claim 1, wherein the component (C) is at least one selected from the group consisting of glycidyl (meth)acrylate and 2-isocyanatoethyl (meth)acrylate.

4. The active energy ray-curable resin composition according to claim 1, wherein the component (D) is a compound represented by the following general formula (2):

[Chem. 2]

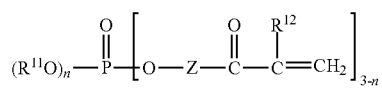
(2)

wherein, in the formula (2), $R^{11}$ is a hydrogen atom, an alkyl group having from 1 to 12 carbon atoms, or a monovalent group represented by $-(C_mH_{2m})_p-OH$, where m is a number fron 1 to 6 and p is a number from 1 to 10; $R^{12}$ is a hydrogen atom or a methyl group; Z is a divalent group represented by $-(C_rH_{2r}O)_q-$, where r is a number from 1 to 6 and q is a number from 1 to 20, or $-R^{13}-COO-(C_rH_{2r}O)_q-$, where $R^{13}$ is an alkylene group having from 1 to 12 carbon atoms and r and q are the same as described above; and n is a number of 0, 1, or 2.

5. The active energy ray-curable resin composition according to claim 1, wherein a content of the component (D) is from 0.1 to 10 parts by mass relative to 100 parts by mass of the reaction product (X).

6. The active energy ray-curable resin composition according to claim 1, further comprising a photopolymerization initiator.

7. The active energy ray-curable resin composition according to claim 1, further comprising a non-spherical inorganic particle.

8. A method for producing the active energy ray-curable resin composition described in claim 1, the method comprising: preparing a solution (a) containing the reaction product (X); mixing the component (C) and the component (D) or a solution containing the component (D) to prepare a solution (b); and mixing the solution (a) and the solution (b).

9. A method for producing the active energy ray-curable resin composition described in claim 7, the method comprising: preparing a solution (a) containing the reaction product (X); mixing the component (C) and the non-spherical inorganic particle or a dispersion liquid of the non-spherical inorganic particle, then adding the component (D) or a solution containing the component (D) to prepare a solution (b'); and mixing the solution (a) and the solution (b').

10. A cured product of the active energy ray-curable resin composition described in claim 1.

11. A gas barrier film comprising: a substrate film comprising an inorganic thin film layer; and a cured resin layer formed of the cured product described in claim 10.

12. A laminate comprising the gas barrier film described in claim 11 and a thermoplastic resin layer.

* * * * *